United States Patent
Gerth et al.

(10) Patent No.: US 12,376,946 B2
(45) Date of Patent: Aug. 5, 2025

(54) CONTROL OF VIRTUAL OBJECTS USING A DENTAL ARTICULATOR

(71) Applicant: EXOCAD GMBH, Darmstadt (DE)

(72) Inventors: Maik Gerth, Seeheim-Jugenheim (DE); Paul Schnitzspan, Seeheim-Jugenheim (DE)

(73) Assignee: EXOCAD GMBH, Darmstadt (DE)

( * ) Notice: Subject to any disclaimer, the term of this patent is extended or adjusted under 35 U.S.C. 154(b) by 373 days.

(21) Appl. No.: 18/119,088

(22) Filed: Mar. 8, 2023

(65) Prior Publication Data

US 2024/0299141 A1    Sep. 12, 2024

(51) Int. Cl.
| | |
|---|---|
| *A61C 13/00* | (2006.01) |
| *A61C 9/00* | (2006.01) |
| *A61C 11/00* | (2006.01) |

(52) U.S. Cl.
CPC ........ *A61C 13/0004* (2013.01); *A61C 9/0053* (2013.01)

(58) Field of Classification Search
CPC ... A61C 13/0004; A61C 9/0053; A61C 11/00; A61C 13/00
See application file for complete search history.

(56) References Cited

U.S. PATENT DOCUMENTS

| | | | |
|---|---|---|---|
| 2002/0048741 A1* | 4/2002 | Jordan | A61C 13/0003 433/213 |
| 2013/0066598 A1 | 3/2013 | Fisker et al. | |
| 2015/0019176 A1* | 1/2015 | Presswood | G06F 30/00 703/1 |
| 2016/0157969 A1 | 6/2016 | Fisker et al. | |

FOREIGN PATENT DOCUMENTS

WO    WO-2022030740 A1    2/2022

* cited by examiner

*Primary Examiner* — Siamak Harandi
(74) *Attorney, Agent, or Firm* — PERRY + CURRIER INC.

(57) ABSTRACT

Disclosed herein is a method of dental imaging. The method comprises receiving data descriptive of at least one three-dimensional digital dental element. The at least one three-dimensional digital dental element comprises a defined position relative to a dental articulator. The method further comprises repeatedly: receiving the optical imaging data descriptive of the dental articulator from an optical sensor; receiving the localization data in response to inputting the optical imaging data into a localization module; performing a calculation comprising calculating at least one three-dimensional object aligned to the localization data descriptive of the dental articulator using the defined position of the at least one three-dimensional digital dental element and the localization data descriptive of the dental articulator; and providing a rendering of the at least one three-dimensional object.

20 Claims, 6 Drawing Sheets

CONTROL OF VIRTUAL OBJECTS USING A DENTAL ARTICULATOR

FIELD OF THE INVENTION

The invention relates to dental technology, in particular to the digital modeling of dental articulators.

BACKGROUND AND RELATED ART

Dental articulators mechanism which are designed to replicate the jaw movement of a subject. A dental dentition as well as dental restoration elements, such as crowns, may be installed into a dental articulator as a means to examine how well they fit and work together. Dental technicians are accustomed to evaluating dental dentitions as well as dental restoration elements using a dental articulator.

SUMMARY

The invention provides for a dental system, a method, and a computer program in the independent claims. Embodiments are given in the dependent claims.

In one aspect the invention provides for a dental system that comprises a memory that stores machine-executable instructions and a localization module. The localization module is configured for outputting localization data that is descriptive of a dental articulator in response to receiving optical imaging data descriptive of the dental articulator. In the case that the dental articulator comprises multiple pieces or parts then the localization data is provided for each of these parts. The dental system further comprises a computational system. Execution of the machine-executable instructions causes the computational system to receive data that is descriptive of at least one three-dimensional digital dental element.

The at least one three-dimensional digital dental element comprises a defined position relative to the dental articulator. Execution of the machine-executable instructions causes the computational system to repeatedly receive the optical imaging data from an optical sensor.

Execution of the machine-executable instructions further causes the computational system to repeatedly receive the localization data in response to inputting the optical imaging data into the localization module. Execution of the machine-executable instructions further causes the computational system to repeatedly perform a calculating comprising calculating at least one three-dimensional object aligned to the localization data that is descriptive of the dental articulator using the defined position of the at least one three-dimensional digital dental element and the localization data that is descriptive of the dental articulator. Execution of the machine-executable instructions further causes the computational system to repeatedly provide a rendering of the at least one three-dimensional object.

This embodiment may be beneficial because it may provide for a means of using a dental articulator as a control service for controlling the rendering.

In one embodiment, the rendering is a two-dimensional image.

In another embodiment the rendering is a three-dimensional model. The three-dimensional model may then be used to provide a two-dimensional image or overlay as well as providing for a virtual reality image.

In some embodiments the dental system may comprise the optical sensor. In other examples the optical imaging data is received remotely from an optical sensor. For example, the computational system could either be located at a location where the user is or else the computational system may for example be available remotely, for example via a web or cloud-based system.

In another embodiment the at least one three-dimensional digital element comprises a three-dimensional dental dentition of a subject. This embodiment may be beneficial because it may provide for a means of using a dental articulator to control a rendering of a three-dimensional dental dentition of the subject.

In another embodiment the three-dimensional dental dentition model is a physical dental dentition of the subject. The localization module is further configured for outputting localization data descriptive of the physical dental dentition in the optical imaging data. In additional to providing the localization data for the dental articulator the localization data is also provided for the physical dental dentition.

It should be noted that the physical dental dentition may comprise more than one physical piece. For example there may be an upper jaw portion and a lower jaw portion to the physical dental dentition that are not connected. In this case, the localization module is able to provide the localization data for these two parts separately.

Likewise, the three-dimensional digital dental dentition of the subject may also comprise an upper jaw portion and a lower jaw portion so that the three-dimensional dental dentition of the subject comprises two separate models.

In some embodiments, the physical dental detention may comprise the top jaw portion and the bottom jaw portion in some embodiments.

In other embodiments the physical dental dentition may comprise just the top jaw portion or just the bottom jaw portion. If the physical dental dentition comprises just the top jaw portion, then the bottom jaw portion could be provided by a virtual bottom jaw portion by making a virtual bottom jaw portion one of the at least one three-dimensional object.

Likewise, if the physical dental dentition comprises just the bottom jaw portion then the top jaw portion could be provided by a virtual top jaw portion by making a virtual top jaw portion one of the at least one three-dimensional object.

In another embodiment the at least one three-dimensional object comprises a positioning indicator for the physical dental dentition. The performing of the calculation comprises calculating an alignment of the positioning indicator for the physical dental dentition to the localization data descriptive of the dental articulator using the localization data that is descriptive of the physical dental dentition and the localization data that is descriptive of the dental articulator.

As was noted before, the physical dental dentition and the dental articulator may comprise more than one part. In this case, the localization data is provided for each of these parts separately. This embodiment may be beneficial because the providing of the positioning indicator may provide an aid to a technician who is setting up the physical dental dentition in a physical dental articulator. The rendering may provide this positioning indicator and may assist the technician in accurately installing the physical dental dentition into the dental articulator.

In another embodiment the at least one three-dimensional object comprises a virtual dental dentition model from the three-dimensional dental dentition of a subject. This embodiment may be beneficial because it may provide a means of displaying the three-dimensional dental dentition of the subject virtually.

For example, instead of installing a physical dental dentition into the dental articulator the rendering may be used to provide a view of a virtual dental dentition instead. This may have the benefit of eliminating the time necessary to install and construct a physical dental dentition of the subject. This may for example enable rapid prototyping and design of a dental dentition for the subject.

In another embodiment the at least one three-dimensional digital dental element comprises a three-dimensional digital dental restoration element. This embodiment may be beneficial because it may provide a means of testing a dental restoration element virtually.

In another embodiment the three-dimensional digital dental restoration element models a physical three-dimensional restoration element of the subject. The localization model is further configured for outputting localization data that is descriptive of the physical three-dimensional restoration element in the optical imaging data. In this embodiment the localization data is additionally provided for the physical three-dimensional restoration element. This may for example enable a means to provide augmented data about the physical three-dimensional restoration element as well as provide a means for aligning or installing it in a physical dental dentition.

In another embodiment the at least one three-dimensional object comprises a positioning indicator for the physical three-dimensional restoration element. The performing of the calculation comprises calculating an alignment of the positioning indicator for the physical three-dimensional restoration element to the localization data that is descriptive of the dental articulator using the localization data descriptive of the physical three-dimensional restoration element and the localization data that is descriptive of the dental articulator. This may for example be useful when a technician is trying to install a physical three-dimensional restoration element into a physical dental dentition. The positioning indicator may assist the operator in properly positioning it.

In another embodiment the at least one three-dimensional object further comprises modification indicators to indicate a difference between the physical three-dimensional digital dental restoration element and the physical three-dimensional restoration element. This for example may be useful when modifying the physical three-dimensional restoration element to appear or be the same as a digital dental restoration element. It may for example indicate an area of the physical three-dimensional restoration element that needs to be filed or have its size reduced.

In another embodiment the at least one three-dimensional object comprises a virtual dental restoration element modeled from the three-dimensional digital dental restoration element. This embodiment may be beneficial because it may provide a means of visualizing the three-dimensional digital dental restoration element along with the articulator.

In another embodiment the three-dimensional digital dental restoration element is a crown.

In another embodiment the three-dimensional digital dental restoration element is a bridge.

In another embodiment the three-dimensional digital dental restoration element is an inlay.

In another embodiment the three-dimensional digital dental restoration element is an onlay.

In another embodiment the three-dimensional digital dental restoration element is a veneer.

In another embodiment the three-dimensional digital dental restoration element is a mockup.

In another embodiment the three-dimensional digital dental restoration element is a provisional.

In another embodiment the three-dimensional digital dental restoration element is a denture.

In another embodiment the three-dimensional digital dental restoration element is a wax-up.

In another embodiment the three-dimensional digital dental restoration element is a bite splint.

In another embodiment the three-dimensional digital dental restoration element is an overdenture. An overdenture as used herein encompasses a dental prosthetic that in use is in contact with, covers, and/or rests on a tooth, a tooth root, and/or dental implant.

In another embodiment the three-dimensional digital dental restoration element is a dental bar.

In another embodiment the three-dimensional digital dental restoration element is an overlay.

In another embodiment the at least one three-dimensional object comprises a contact point indicator for antagonist teeth. This may for example be used for providing augmented information when one is observing the articulator. This may be useful for a technician or user of the articulator to see if the teeth sit properly and if the contact points are as expected.

In another embodiment the at least one three-dimensional object comprises a tooth motion trajectory indicator descriptive of tooth motion when moving the articulator. This again may be a means of providing augmented information when using the articulator. This may assist the operator in visualizing how the teeth of the dental dentition are working.

In another embodiment the machine-executable instructions are configured to cause the computational system to provide the repeated rendering of the at least one three-dimensional object in response to a change in the localization data of the dental articulator.

This embodiment may be beneficial because this means that the rendering will be updated as the dental articulator is moved. This may for example be useful in providing a virtual reality experience or even in providing an augmented reality display of the dental articulator in use.

In another embodiment the machine-executable instructions are configured to cause the computational system to provide the repeated rendering of the at least one three-dimensional object in response to a change in the localization data of the dental articulator within the predetermined number of frames relative to the optical imaging data. This embodiment may be beneficial because this means that there is a maximum lag between moving the articulator and the rendering of the at least one three-dimensional object being updated. This may for example be particularly useful in augmented reality situations.

In another embodiment the dental system further comprises the articulator.

In another embodiment the articulator comprises a top jaw portion and a bottom jaw portion. The top jaw portion and the bottom jaw portion form a moveable linkage.

In another embodiment the localization data comprises top jaw portion localization data and the localization data further comprises bottom jaw portion localization data. This means that the localization data provides essentially the coordinates or location of the top jaw portion and the bottom jaw portion separately. This may be very useful in situations where the two are moving relative to each other.

In another embodiment the bottom jaw portion has a fixed position. For example, the bottom jaw may be mounted to a table top or a stand. This may be beneficial in some instances because then the system does not need to, for example, continually recalculate the bottom jaw localization data.

In another embodiment execution of the machine-executable instructions further cause the computational system to display the rendering of the at least one three-dimensional object to an electronic display device. This may be beneficial because then it may be observed by the operator of the dental system.

In another embodiment the dental system further comprises the electronic display device.

In another embodiment the electronic display device is a two-dimensional display. Execution of the machine-executable instructions further causes the computational system to perform any one of the following: render an animation of the dental articulator with the rendering of the at least one three-dimensional object or superimpose the rendering of the at least one three-dimensional object on the optical imaging data. In the first case, the animation is used to replace the optical imaging data. In the second case for example, the optical imaging data could be a video feed. In this case then the at least one three-dimensional object is simply superimposed on the existing video feed.

In another embodiment the electronic display device further comprises an augmented reality system. An augmented reality system, as used herein, encompasses a system where the user of the augmented reality system is able to observe objects normally but there are additionally computer-generated objects or views which are superimposed on this view. An example would be glasses that a subject can look through but then have a display quality where augmented reality data or images can be displayed.

Execution of the machine-executable instructions further causes the computational system to superimpose the rendering of the at least one three-dimensional object on a view of the dental articulator using the augmented reality system.

In another embodiment the dental system further comprises the optical sensor. The optical sensor is configured for providing the optical imaging data that is descriptive of the dental articulator.

In another embodiment the optical sensor is a camera system.

In another embodiment the optical imaging data is a video stream.

In another embodiment the optical sensor is an intra-oral scanner. An intra-oral scanner, as used herein, encompasses a scanner which is able to be inserted into the mouth of a subject and which may be used to generate images or models of the subject's teeth. The intra-oral scanner may for example be held next to the articulator to determine the position of the articulator.

In another embodiment the localization module is configured for outputting the localization data descriptive of the dental articulator in response to receiving the optical imaging data that is descriptive of the dental articulator by receiving a three-dimensional digital model of the dental articulator, the three-dimensional digital model defining a geometric limit for a geometric form of the dental articulator. The localization module is further configured for outputting the localization data descriptive of a dental articulator in response to receiving the optical imaging data descriptive of the dental articulator by repeatedly detecting structural elements within the optical imaging data, the structural elements defining reference points for a target position of the three-dimensional digital model of the dental articulator. Also repeatedly determining the localization data by using the reference points defined by the structural elements and also repeatedly outputting the localization data.

In other embodiments, the localization module may provide additional localization data. In particular in some embodiment the dental articulator comprises an upper portion and a lower portion. The localization data may be provided for these two portions separately.

In other embodiments, the localization module may also be configured to additionally output localization data descriptive of the physical dental dentition in response to receiving the optical imaging data. The localization module may additionally be configured to: receive a three-dimensional digital model of the physical dental dentition, the three-dimensional digital model of the physical dental dentition defining a geometric limit for a geometric form of the physical dental dentition. The localization module is further configured for outputting the localization data descriptive of the physical dental dentition in response to receiving the optical imaging data descriptive of the physical dental dentition by repeatedly: detecting structural elements within the optical imaging data, the structural elements defining reference points for a target position for the three-dimensional digital model of the physical dental dentition; and determining the localization data by using the reference points defined by the structural elements; and outputting the localization data for the physical dental dentition.

In other embodiments the localization module is configured to additionally outputting the localization data descriptive of the physical three-dimensional restoration element in response to receiving the optical imaging data descriptive of the physical three-dimensional restoration element by: receiving a three-dimensional digital model of the physical three-dimensional restoration element, the three-dimensional digital model of the physical three-dimensional restoration element defining a geometric limit for a geometric form of the physical three-dimensional restoration element. The localization module is further configured for outputting the localization data descriptive of a physical three-dimensional restoration element in response to receiving the optical imaging data descriptive of the physical three-dimensional restoration element by repeatedly: detecting structural elements within the optical imaging data, the structural elements defining reference points for a target position for the three-dimensional digital model of the physical three-dimensional restoration element; and determining the localization data by using the reference points defined by the structural elements; and outputting the localization data descriptive of the physical three-dimensional restoration element.

In another aspect the invention provides for a method of dental imaging. The method comprises receiving data descriptive of at least one three-dimensional digital dental element. The at least one three-dimensional digital dental element comprises a defined position relative to a dental articulator. The method further comprises repeatedly receiving optical imaging data from an optical sensor. The optical imaging data is descriptive of the dental articulator. That is to say the dental articulator is at least partially imaged in the optical imaging data. The method further comprises repeatedly receiving the localization data in response to inputting the optical imaging data into a localization module. The localization module is configured for outputting localization data that is descriptive of the dental articulator in response to receiving the optical imaging data that is descriptive of the dental articulator.

The method further comprises repeatedly performing a calculation comprising calculating the at least one three-dimensional object that is aligned to the localization data and is descriptive of the dental articulator using the defined position of the at least one three-dimensional digital dental element and the localization data that is descriptive of the dental articulator. The method further comprises repeatedly providing a rendering of the at least one three-dimensional object.

The data descriptive of the at least one three-dimensional digital dental element may take different forms in different examples. In one example the data descriptive of at least one three-dimensional digital dental element may be a three-dimensional mesh which defines a shape of the at least one three-dimensional digital dental element. In other examples the data descriptive of the at least one three-dimensional digital dental element is a three-dimensional solid model, a three-dimensional wireframe model, or a three-dimensional surface model.

In another aspect, the invention provides for a computer program comprising machine-executable instructions for execution by a computational system that controls or is configured for controlling a dental system. The execution of the machine-executable instructions causes the computational system to receive data descriptive of at least one three-dimensional digital dental element. The at least one three-dimensional digital dental element comprises a defined position relative to the dental articulator. Execution of the machine-executable instructions causes the computational system to repeatedly receive the optical imaging data from an optical sensor. Execution of the machine-executable instructions further causes the computational system to repeatedly receive the localization data in response to inputting the optical imaging data into a localization module. The localization module is configured for outputting localization data descriptive of the dental articulator in response to receiving the optical imaging data that is descriptive of the dental articulator.

Execution of the machine-executable instructions further causes the computational system to repeatedly perform a calculation comprising calculating at least one three-dimensional object that is aligned to the localization data descriptive of the dental articulator using the defined position of the at least one three-dimensional digital dental element and the localization data descriptive of the dental articulator. Execution of the machine-executable instructions further causes the computational system to repeatedly provide a rendering of the at least one three-dimensional object.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. 'Computer memory' or 'memory' is an example of a computer-readable storage medium.

Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general-purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

'A hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
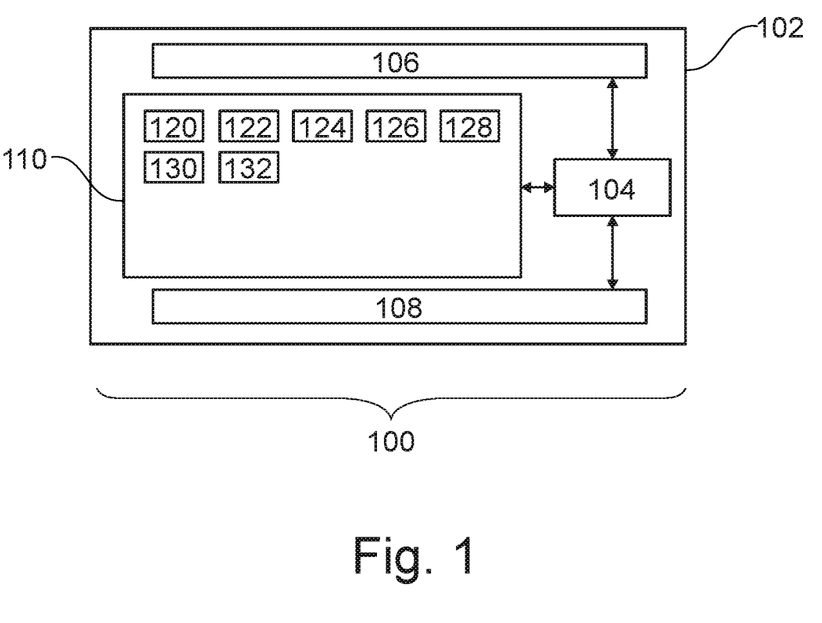
FIG. 1 illustrates an example of a dental system.

FIG. 1 illustrates an example of a dental system 100. The dental system 100 is shown as comprising a computer 102. The computer 102 could be integrated into different sorts of systems. In one example it could be a desktop computer. In another example it could be a mobile computing device such as a smartphone. In yet other examples the computer 102 could be a remote blade or cloud computer. The computer 102 is intended to represent one or more computers which may be distributed. The computer 102 is shown as comprising a computational system 104. The computational system 104 is intended to represent one or more computational systems. The computer 102 is further shown as containing an optional hardware interface 106. The hardware interface may enable the computational system 104 to control other components such as an optical sensor if such other components are present. The computational system 104 is further shown as being in communication with an optional user interface 108. The user interface 108 may for example also include a display device. This could include such things as a two-dimensional computer display, a touchscreen, a virtual reality system, and an augmented reality system.

The computational system 104 is further shown as being in communication with a memory 110. The memory 110 is intended to represent various types of memory which the computational system 104 may have access to. In one example the memory 110 is a non-transitory storage medium.

The memory 110 is shown as containing machine-executable instructions 120. The machine-executable instructions 120 may enable the computational system 104 to perform various numerical, image processing, and computational tasks. The machine-executable instructions 120 may also enable the computational system 104 to control and operate other components via the hardware interface 106. The memory 110 is further shown as containing a localization module 122. The localization module 122 is configured to the optical imaging data 126 and in response output localization data 128. The memory 110 is further shown as containing data 124 that is descriptive of at least one three-dimensional digital dental element. The three-dimensional digital element may for example be a three-dimensional model of such things as a dental dentition, or a dental restoration element.

The memory 110 is further shown as containing optical imaging data 126 that was acquired by an optical sensor that was imaging a dental articulator. The memory 110 is further shown as containing localization data 128 that was received from the localization module 122 in response to inputting the optical imaging data 126 into it. The localization data 128 is descriptive of a location of a dental articulator. The dental articulator may for example have two parts, a lower portion and an upper portion. The localization data 128 may specify the location of these two parts separately. The memory 110 is further shown as containing a three-dimensional object 130 that has been calculated or modeled using the at least one three-dimensional object and aligning it to the localization data of the dental articulator.

This for example enables the correct placement of the three-dimensional object 130 relative to the location of the dental articulator. The memory 110 is further shown as containing a rendering of the three-dimensional object 132. The rendering 132 may take different forms in different examples. For example, if it is provided to an augmented reality the rendering of the three-dimensional object 132 may simply be the model correctly placed relative to the location of the dental articulator. In other cases, it could be for example an animation of the dental articulator that is displayed on a two-dimensional screen or in a virtual reality system. In this case the rendering may include a rendering of the dental articulator in the correct position, as defined by the localization data, with the rendering of the three-dimensional object 132 placed in the proper location. Another example would be to take the rendering of the three-dimensional object 132 and superimpose it on the optical imaging data 126. For example, the optical imaging data 126 could be a video feed. The three-dimensional object 130 could then be superimposed in the correct location using the rendering of the three-dimensional object.

Figure 2:
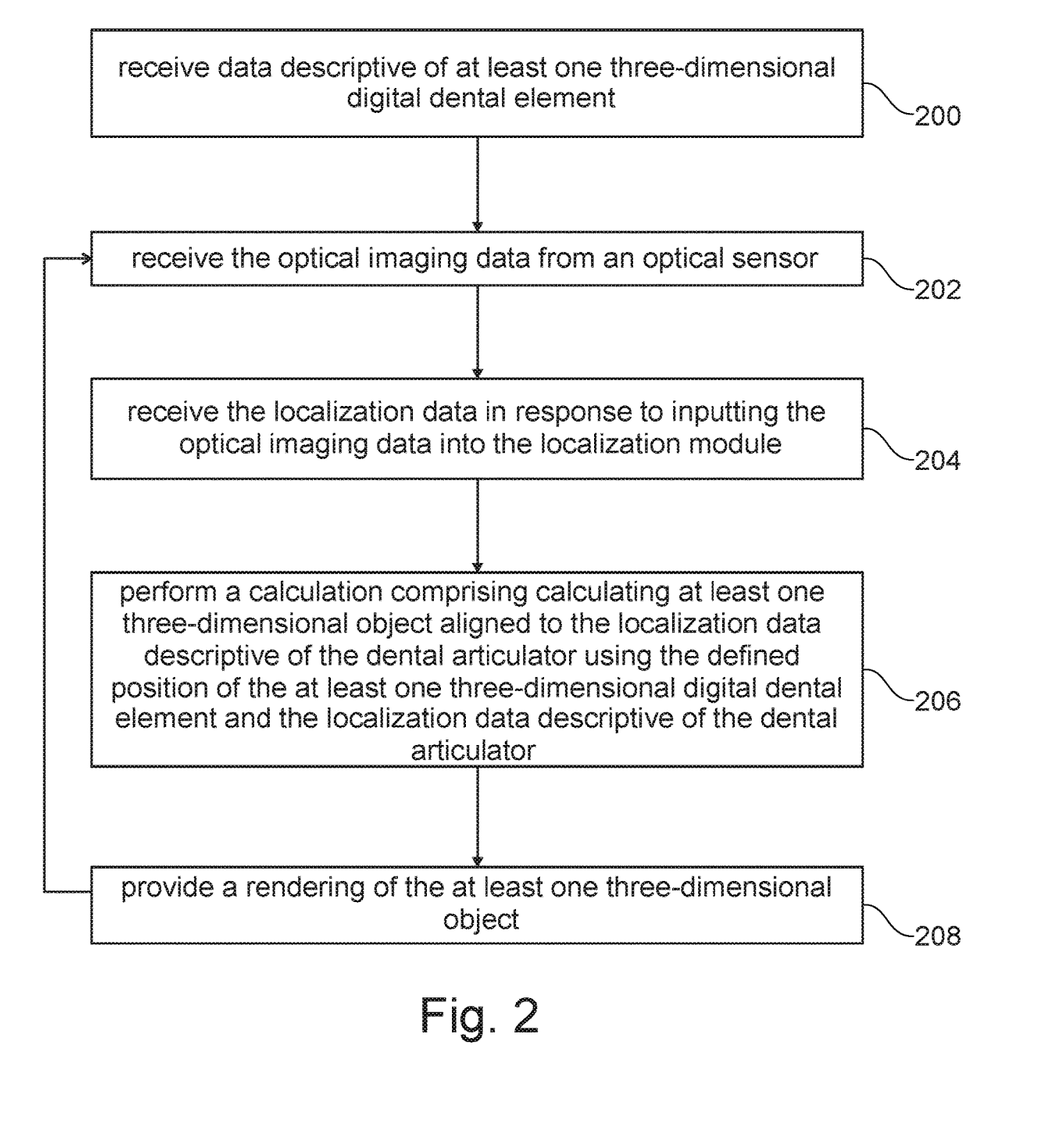
FIG. 2 shows a method of operating the dental system of FIG. 1.

FIG. 2 shows a flowchart which illustrates a method of operating the dental system 100 of FIG. 1. First, in step 200, the data 124 that is descriptive of the at least one three-dimensional digital element is received. Next, in step 202, the optical imaging data 126 is received from the optical sensor. In this case, the optical sensor is not present. The optical imaging data could for example be received via a network or other data communication such as a Bluetooth connection. Next, in step 204, the localization data 128 is received in response to inputting the optical imaging data 126 into the localization module 122. Then, in step 206, a calculation is performed which comprises calculating at least one three-dimensional object 130 that is aligned to the localization data that is description of the dental articulator using the defined position of the at least one three-dimensional digital element and the localization data descriptive of the dental articulator. Then, in step 208, the rendering 132 of the at least one three-dimensional object is provided. In many cases the optical imaging data may be provided continuously and the rendering can be provided as the articulator is moved or articulated. After step 208 the method may return back to step 202 forming a closed loop where the optical imaging data is received and the rendering is updated in response.

Figure 3:
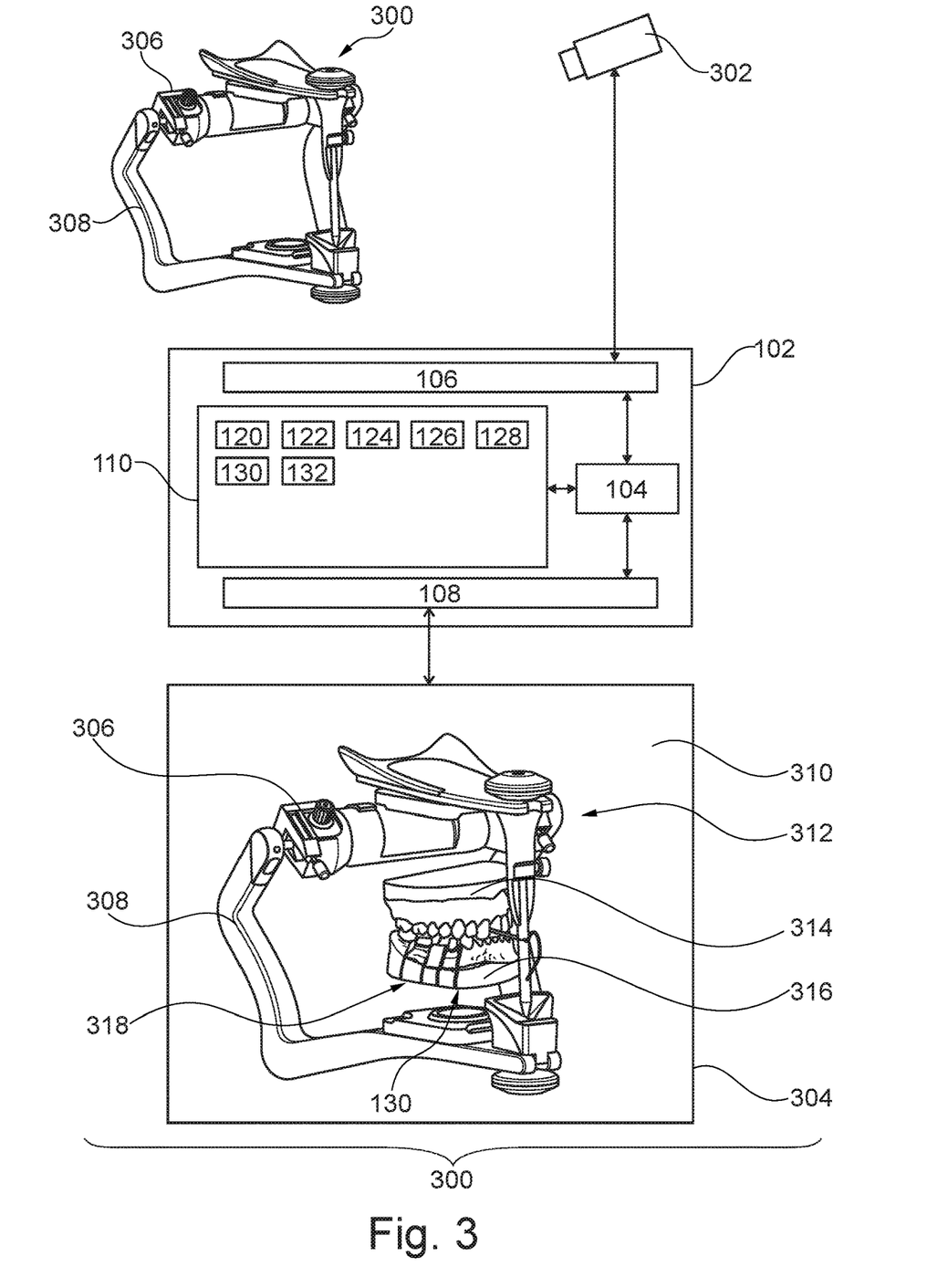
FIG. 3 illustrates a further example of a dental system.

FIG. 3 illustrates a further example of a dental system 300. The dental system 300 in FIG. 3 is similar to the dental system 100 depicted in FIG. 1 except that it is shown as additionally comprising a dental articulator 301, an optical sensor 302, and an electronic display device 304. The dental articulator 301 is shown as being within the field of view of the optical sensor 302. The dental articulator 301 comprises an upper portion 306 and a lower portion 308. The localization data 128 may be descriptive of the location of the upper portion 306 and the lower portion 308 separately. In this example there is a pivot between the upper portion 306 and the lower portion 308. There are therefore constraints on the physical relationship between the two portions 306, 308.

The optical sensor 302 is shown as being in communication with the hardware interface 106. The computational system 104 then receives the optical imaging data 126 from the optical sensor 302.

The user interface 108 is shown as comprising the electronic display device 304. In this example, the electronic display device 304 displays a two-dimensional image 310. The two-dimensional image 310 comprises an animated dental articulator 312 comprising the upper portion 306 and the lower portion 308. The position of the animation 312 may be controlled by the localization data. In this case, the three-dimensional object 130 comprises an upper jaw portion of a virtual dental dentition 314 as well as a lower jaw portion of a virtual dental dentition 316. These two portions, 314, 316 are able to move independently with the two portions 306, 308 of the dental articulator 301. This example is also shown as containing several virtual dental restoration elements 318.

In the example illustrated in FIG. 3 it can be seen that as the dental articulator 301 is articulated the image 310 will be updated and provide a virtual view of the virtual dental dentitions 314, 316 and virtual restoration elements 318. The articulator 301 can be seen as a control element for controlling the image 310. In other examples, the virtual dental dentitions 314, 316 could be superimposed on the original image data. For example, if the optical imaging data was a video stream, the dental dentitions 314, 316 could be superimposed on these images. Another modification that would be possible would be instead of showing a two-dimensional image 310 would be to display the same image in a virtual reality system with three-dimensional models. Another possibility would be to display the three-dimensional models 314, 316, 318 with an augmented reality system.

Figure 4:
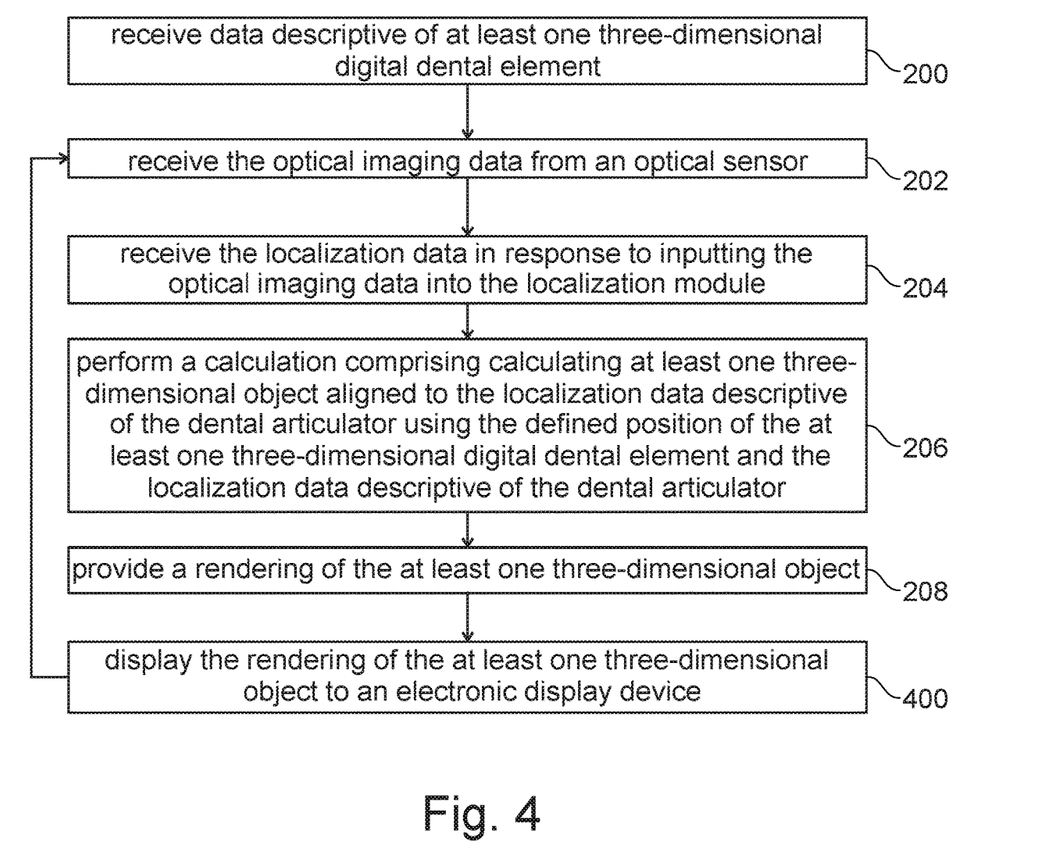
FIG. 4 shows a method of operating the dental system of FIG. 3.

FIG. 4 shows a flowchart which illustrates one method of controlling the dental system 300 of FIG. 3. Steps 200, 202, 204, 206, and 208 are performed as was illustrated in FIG. 2. After step 208 is performed step 400 is performed. In step 400 the rendering 132 of the at least one three-dimensional object is displayed on the electronic display device 304. After step 400 is performed the method then may return back to step 202 to repeat the loop.

Figure 5:
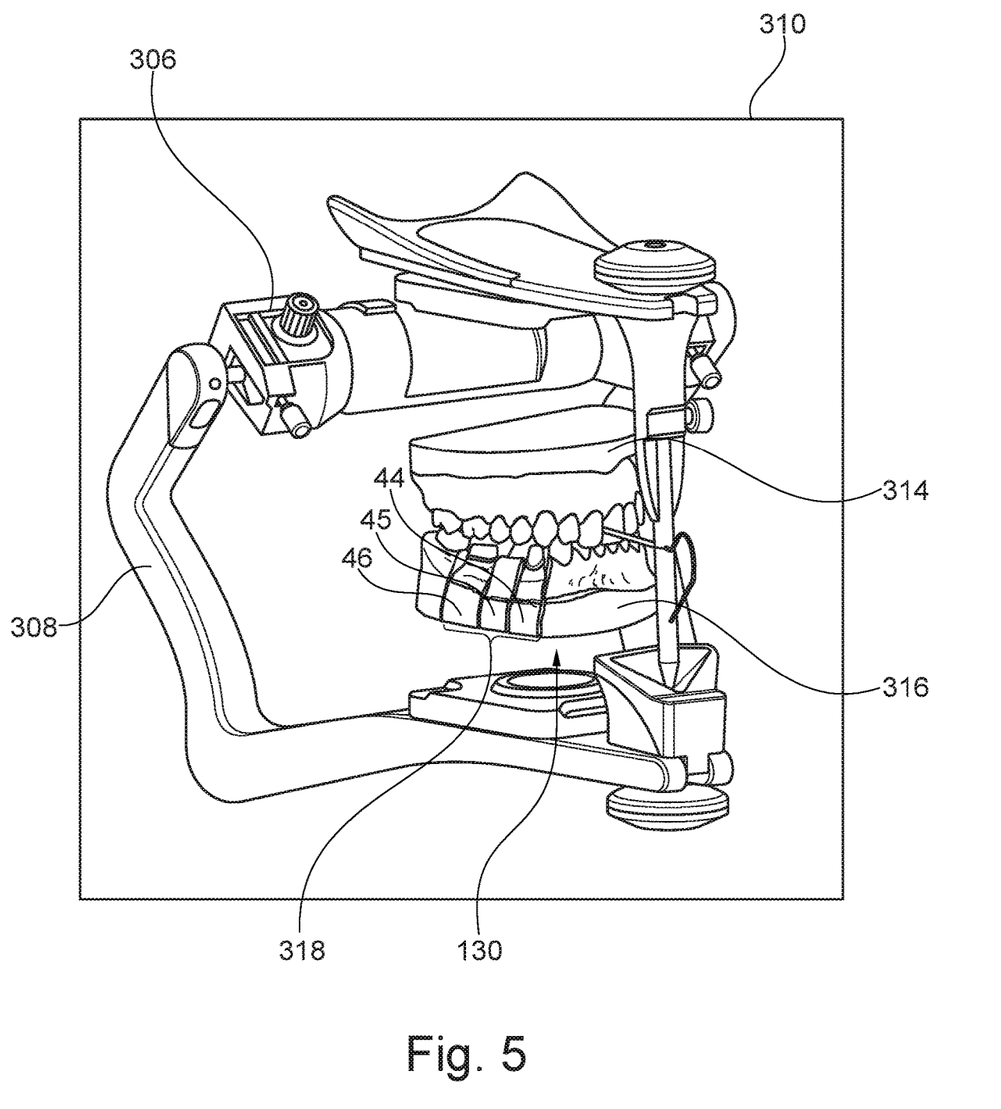
FIG. 5 illustrates a rendering of a dental articulator and several virtual objects.

FIG. 5 shows a close-up view of the image 310.

Figure 6:
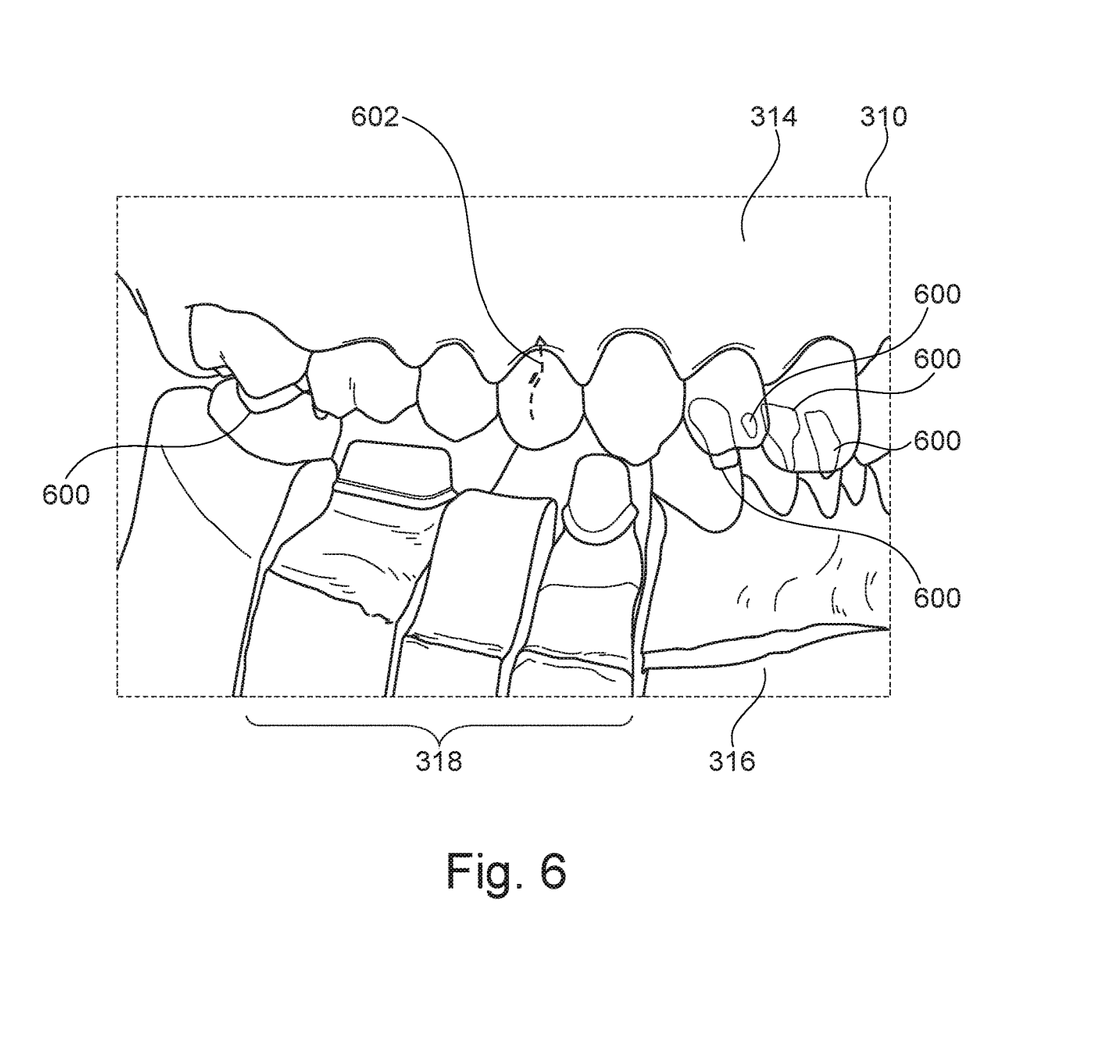
FIG. 6 illustrates an expanded view of the rendering illustrated in FIG. 5.

FIG. 6 shows a close-up view of a portion of image 310. In this close-up view a number of contact point indicators 600 are visible. These contact point indicators are a description of contact points for antagonist teeth. Also shown is a tooth motion trajectory indicator 602.

This for example may be a line or other indicator which may indicate the trajectory of a tooth when the articulator of FIG. 1 is articulated.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "clause" as used therein may refer to such a "preferred embodiment".

Clause 1. A dental system comprising:
a memory storing machine executable instructions and a localization module, wherein the localization module is configured for outputting localization data descriptive of a dental articulator in response to receiving optical imaging data descriptive of the dental articulator; and
a computational system, wherein execution of the machine executable instructions causes the computational system to receive data descriptive of at least one three-dimensional digital dental element, wherein the at least one three-dimensional digital dental element comprises a defined position relative to the dental articulator, wherein execution of the machine executable instructions causes the computational system to repeatedly:
receive the optical imaging data from an optical sensor;
receive the localization data in response to inputting the optical imaging data into the localization module;
perform a calculation comprising calculating at least one three-dimensional object aligned to the localization data descriptive of the dental articulator using the defined position of the at least one three-dimensional digital dental element and the localization data descriptive of the dental articulator; and
provide a rendering of the at least one three-dimensional object.

Clause 2. The dental system of clause 1, wherein the at least one three-dimensional digital dental element comprises a three-dimensional dental dentition of a subject.

Clause 3. The dental system of clause 2, wherein the three-dimensional dental dentition models a physical dental dentition of the subject, wherein the localization module is further configured for outputting localization data descriptive of the physical dental dentition in the optical imaging data.

Clause 4. The dental system of clause 3, wherein the at least one three-dimensional object comprises a positioning indicator for the physical dental dentition, and wherein the performing the calculation comprises calculating an alignment of the positioning indicator for the physical dental dentition to the localization data descriptive of the dental articulator using the localization data descriptive of the physical dental dentition and the localization data descriptive of the dental articulator.

Clause 5. The dental system of clause 3 or 4, wherein the localization module is configured to outputting the localization data descriptive of the physical dental dentition in response to receiving the optical imaging data descriptive of the dental articulator by:
receiving a three-dimensional digital model of the physical dental dentition, the three-dimensional digital model of the physical dental dentition defining a geometric limit for a geometric form of the physical dental dentition,
wherein the localization module is further configured for outputting the localization data descriptive of the physical dental dentition in response to receiving the optical imaging data descriptive of the physical dental dentition by repeatedly:
detecting structural elements within the optical imaging data, the structural elements defining reference points for a target position for the three-dimensional digital model of the physical dental dentition; and
determining the localization data by using the reference points defined by the structural elements; and
outputting the localization data.

Clause 6. The dental system of clause 2, wherein the at least one three-dimensional digital object comprises a virtual dental dentition modeled from the three-dimensional dental dentition of a subject.

Clause 7. The dental system of any one of clauses 2 through 6, wherein the at least one three-dimensional digital dental element comprises a three-dimensional digital dental restoration element.

Clause 8. The dental system of clause 7, wherein the three-dimensional digital dental restoration element models a physical three-dimensional restoration element of the subject, wherein the localization model is further configured for outputting localization data descriptive of the physical three-dimensional restoration element in the optical imaging data.

Clause 9. The dental system of clause 8, wherein the at least one three-dimensional object comprises a positioning indicator for the physical three-dimensional restoration element, and wherein the performing the calculation comprises calculating an alignment of the positioning indicator for the physical three-dimensional restoration element to the localization data descriptive of the dental articulator using the localization data descriptive of the physical three-dimensional restoration element and the localization data descriptive of the dental articulator.

Clause 10. The dental system of clause 8 or 9, wherein the at least one three-dimensional object further comprises modification indicators configured to indicate a difference between the three-dimensional digital dental restoration element and the physical three-dimensional restoration element.

Clause 11. The dental system of any one of clauses 1 through 10, wherein the localization module is configured to outputting the localization data descriptive of the physical three-dimensional restoration element in response to receiving the optical imaging data descriptive of the physical three-dimensional restoration element by:
receiving a three-dimensional digital model of the physical three-dimensional restoration element, the three-dimensional digital model of the physical three-dimensional restoration element defining a geometric limit for a geometric form of the physical three-dimensional restoration element,
wherein the localization module is further configured for outputting the localization data descriptive of a physical three-dimensional restoration element in response to receiving the optical imaging data descriptive of the physical three-dimensional restoration element by repeatedly:
detecting structural elements within the optical imaging data, the structural elements defining reference points for a target position for the three-dimensional digital model of the physical three-dimensional restoration element; and
determining the localization data by using the reference points defined by the structural elements; and
outputting the localization data.

Clause 12. The dental system of clause 7, wherein the at least one three-dimensional object comprises a virtual dental restoration element modeled from the three-dimensional digital dental restoration element.

Clause 13. The medical system of any one of clauses 7 through 12, wherein the three-dimensional digital dental restoration element is any one of the following: a crown, a bridge, an inlay, an onlay, veneer, mock up, provisional, mockup, waxup, bitesplint, provisional, dentures, over dentures, dental bar, and an overlay.

Clause 14. The dental system of any one of clauses 1 through 13, wherein the least one three-dimensional object comprises a contact point indicator for antagonist teeth.

Clause 15. The dental system of any one of clauses 1 through 15, wherein the at least one three-dimensional object comprises a tooth motion trajectory indicator descriptive of tooth movement when moving the articulator.

Clause 16. The dental system of any one of clauses 1 through 15, wherein the machine executable instructions are configured to cause the computational system to provide the repeated rendering of the at least one three-dimensional object in response to a change in the localization data of the dental articulator.

Clause 17. The dental system of any one of clauses 1 through 16, wherein the machine executable instructions are configured to cause the computational system to provide the repeated rendering of at least one three-dimensional object in response to a change in the localization data of the dental articulator within a predetermined number of frames relative to the optical imaging data.

Clause 18. The dental system of any one of the preceding clauses, wherein the dental system further comprises the articulator.

Clause 19. The dental system of any one of the preceding clauses, wherein the dental articulator comprises a top jaw portion and a bottom jaw portion, wherein the top jaw portion and the bottom jaw portion form a movable linkage, and wherein the localization data comprises top jaw portion localization data, and wherein the localization data further comprises bottom jaw portion localization data.

Clause 20. The dental system of clause 19, wherein the bottom jaw portion has a fixed position.

Clause 21. The dental system of any one of clauses 1 through 20, wherein execution of the machine executable instructions further causes the computational system to display the rendering of the at least one three-dimensional object to an electronic display device.

Clause 22. The dental system of clause 21, wherein the dental system further comprises the electronic display device.

Clause 23. The dental system of clause 21 or 22, wherein the electronic display device is a two-dimensional display, wherein execution of the machine executable instructions further causes the computational system to perform any one of the following: render an animation of the dental articulator with the rendering of the at least one three-dimensional object or superimpose the rendering of the at least one three-dimensional object on the optical imaging data.

Clause 24. The dental system of clause 19 or 20, wherein the electronic display device further comprises an augmented reality system, wherein execution of the machine executable instructions further causes the computational system superimpose the rendering of the at least one three-dimensional object on a view of the dental articulator using the augmented reality system.

Clause 25. The dental system of any one of clauses 1 through 24, wherein the dental system further comprises the optical sensor, wherein the optical sensor is configured for providing the optical imaging data descriptive of the dental articulator.

Clause 26. The dental system of any one of clauses 1 through 25, wherein the optical sensor is a camera system.

Clause 27. The dental system of any one of clauses 1 through 26, wherein the optical imaging data is a video stream.

Clause 28. The dental system of any one of clauses 1 through 25, wherein the optical sensor is an intraoral scanner.

Clause 29. The dental system of any one of clauses 1 through 28, wherein the localization module is configured to outputting the localization data descriptive of the dental articulator in response to receiving the optical imaging data descriptive of the dental articulator by:
receiving a three-dimensional digital model of the dental articulator, the three-dimensional digital model defining a geometric limit for a geometric form of the dental articulator,
wherein the localization module is further configured for outputting the localization data descriptive of a dental articulator in response to receiving the optical imaging data descriptive of the dental articulator by repeatedly:
detecting structural elements within the optical imaging data, the structural elements defining reference points for a target position for the three-dimensional digital model of the dental articulator; and
determining the localization data by using the reference points defined by the structural elements; and
outputting the localization data.

Clause 30. A method of dental imaging,
wherein the method comprises receiving data descriptive of at least one three-dimensional digital dental element, wherein the at least one three-dimensional digital dental element comprises a defined position relative to a dental articulator, wherein the method further comprises repeatedly:
receiving the optical imaging data descriptive of the dental articulator from an optical sensor;
receiving the localization data in response to inputting the optical imaging data into a localization module, wherein the localization module is configured for outputting localization data descriptive of a dental articulator in response to receiving the optical imaging data descriptive of the dental articulator;
performing a calculation comprising calculating at least one three-dimensional object aligned to the localization data descriptive of the dental articulator using the defined position of the at least one three-dimensional digital dental element and the localization data descriptive of the dental articulator; and
providing a rendering of the at least one three-dimensional object.

Clause 31. A computer program comprising machine executable instructions for execution by a computational system configured for controlling a dental system, wherein execution of the machine executable instructions causes the computational system to receive data descriptive of at least one three-dimensional digital dental element, wherein the at least one three-dimensional digital dental element comprises a defined position relative to a dental articulator, wherein execution of the machine executable instructions causes the computational system to repeatedly:
receive the optical imaging data descriptive of the dental articulator from an optical sensor;
receive the localization data in response to inputting the optical imaging data into a localization module, wherein the localization module is configured for outputting localization data descriptive of a dental articulator in response to receiving the optical imaging data descriptive of the dental articulator;
perform a calculation comprising calculating at least one three-dimensional object aligned to the localization data descriptive of the dental articulator using the defined position of the at least one three-dimensional digital dental element and the localization data descriptive of the dental articulator; and
provide a rendering of the at least one three-dimensional object.

LIST OF REFERENCE NUMERALS 100 dental system
102 computer
104 computational system
106 hardware interface
108 user interface
110 memory
120 machine executable instructions
122 localization module
124 data descriptive of at least one three-dimensional digital dental element
126 optical imaging data
128 localization data
130 three-dimensional object
132 rendering of three-dimensional object
200 receive data descriptive of at least one three-dimensional digital dental element
202 receive the optical imaging data from an optical sensor;
204 receive the localization data in response to inputting the optical imaging data into the localization module
206 perform a calculation comprising calculating at least one three-dimensional object aligned to the localization data descriptive of the dental articulator using the defined position of the at least one three-dimensional digital dental element and the localization data descriptive of the dental articulator
208 provide a rendering of the at least one three-dimensional object
300 dental system
301 dental articulator
302 optical sensor
304 electronic display device
306 upper portion of dental articulator
308 lower portion of dental articulator
310 image
312 animated dental articulator
314 upper jaw portion of a virtual dental dentition
316 lower jaw portion of a virtual dental dentition
318 virtual dental restoration element
400 display the rendering of the at least one three-dimensional object to an electronic display device
600 contact point indicator
602 tooth motion trajectory indicator

What is claimed is:

1. A dental system comprising:
a memory storing machine executable instructions and a localization module, wherein the localization module is configured for outputting localization data descriptive of a dental articulator in response to receiving optical imaging data descriptive of the dental articulator; and
a computational system, wherein execution of the machine executable instructions causes the computational system to receive data descriptive of at least one three-dimensional digital dental element, wherein the at least one three-dimensional digital dental element comprises a defined position relative to the dental articulator, wherein execution of the machine executable instructions causes the computational system to repeatedly:
receive the optical imaging data from an optical sensor;
receive the localization data in response to inputting the optical imaging data into the localization module;
perform a calculation comprising calculating at least one three-dimensional object aligned to the localization data descriptive of the dental articulator using the defined position of the at least one three-dimensional digital dental element and the localization data descriptive of the dental articulator; and
provide a rendering of the at least one three-dimensional object.

2. The dental system of claim 1, wherein the at least one three-dimensional digital dental element comprises a three-dimensional dental dentition of a subject.

3. The dental system of claim 2, wherein the three-dimensional dental dentition models a physical dental dentition of the subject, wherein the localization module is further configured for outputting localization data descriptive of the physical dental dentition in the optical imaging data.

4. The dental system of claim 2, wherein the at least one three-dimensional digital object comprises a virtual dental dentition modeled from the three-dimensional dental dentition of a subject.

5. The dental system of any one of claim 2, wherein the at least one three-dimensional digital dental element comprises a three-dimensional digital dental restoration element.

6. The dental system of claim 5, wherein the three-dimensional digital dental restoration element models a physical three-dimensional restoration element of the subject, wherein the localization model is further configured for outputting localization data descriptive of the physical three-dimensional restoration element in the optical imaging data.

7. The dental system of claim 5, wherein the at least one three-dimensional object comprises a virtual dental restoration element modeled from the three-dimensional digital dental restoration element, wherein the three-dimensional digital dental restoration element is any one of the following: a crown, a bridge, an inlay, an onlay, veneer, mock up, provisional, mockup, waxup, bitesplint, provisional, dentures, over dentures, dental bar, and an overlay.

8. The dental system of claim 1, wherein the least one three-dimensional object comprises a contact point indicator for antagonist teeth.

9. The dental system of claim 1, wherein the at least one three-dimensional object comprises a tooth motion trajectory indicator descriptive of tooth movement when moving the articulator.

10. The dental system of claim 1, wherein the machine executable instructions are configured to cause the computational system to provide the repeated rendering of the at least one three-dimensional object in response to a change in the localization data of the dental articulator.

11. The dental system of claim 1, wherein the machine executable instructions are configured to cause the computational system to provide the repeated rendering of at least one three-dimensional object in response to a change in the localization data of the dental articulator within a predetermined number of frames relative to the optical imaging data.

12. The dental system of claim 1, wherein the dental system further comprises the articulator.

13. The dental system of claim 1, wherein the articulator comprises a top jaw portion and a bottom jaw portion, wherein the top jaw portion and the bottom jaw portion form a movable linkage, and wherein the localization data comprises top jaw portion localization data, and wherein the localization data further comprises bottom jaw portion localization data.

14. The dental system of claim 1, wherein execution of the machine executable instructions further causes the computational system to display the rendering of the at least one three-dimensional object to an electronic display device, wherein the dental system further comprises the electronic display device.

15. The dental system of claim 14, wherein the electronic display device is a two-dimensional display, wherein execution of the machine executable instructions further causes the computational system to perform any one of the following: render an animation of the dental articulator with the rendering of the at least one three-dimensional object or superimpose the rendering of the at least one three-dimensional object on the optical imaging data.

16. The dental system of claim 14, wherein the electronic display device further comprises an augmented reality system, wherein execution of the machine executable instructions further causes the computational system to superimpose the rendering of the at least one three-dimensional object on a view of the dental articulator using the augmented reality system.

17. The dental system of claim 1, wherein the dental system further comprises the optical sensor, wherein the optical sensor is configured for providing the optical imaging data descriptive of the dental articulator, wherein the optical sensor is a camera system or an intraoral scanner.

18. The dental system of claim 1, wherein the localization module is configured to outputting the localization data descriptive of the dental articulator in response to receiving the optical imaging data descriptive of the dental articulator by:
receiving a three-dimensional digital model of the dental articulator, the three-dimensional digital model defining a geometric limit for a geometric form of the dental articulator, wherein the localization module is further configured for outputting the localization data descriptive of a dental articulator in response to receiving the optical imaging data descriptive of the dental articulator by repeatedly:
detecting structural elements within the optical imaging data, the structural elements defining reference points for a target position for the three-dimensional digital model of the dental articulator; and
determining the localization data by using the reference points defined by the structural elements; and
outputting the localization data.

19. A method of dental imaging, wherein the method comprises receiving data descriptive of at least one three-dimensional digital dental element, wherein the at least one three-dimensional digital dental element comprises a defined position relative to a dental articulator, wherein the method further comprises repeatedly:
receiving the optical imaging data descriptive of the dental articulator from an optical sensor;
receiving the localization data in response to inputting the optical imaging data into a localization module, wherein the localization module is configured for outputting localization data descriptive of a dental articulator in response to receiving the optical imaging data descriptive of the dental articulator;
performing a calculation comprising calculating at least one three-dimensional object aligned to the localization data descriptive of the dental articulator using the defined position of the at least one three-dimensional digital dental element and the localization data descriptive of the dental articulator; and
providing a rendering of the at least one three-dimensional object.

20. A non-transitory machine-readable storage medium storing machine executable instructions for execution by a computational system configured for controlling a dental system, wherein execution of the machine executable instructions causes the computational system to receive data descriptive of at least one three-dimensional digital dental element, wherein the at least one three-dimensional digital dental element comprises a defined position relative to a dental articulator, wherein execution of the machine executable instructions causes the computational system to repeatedly.

* * * * *